(No Model.)

H. F. JULIAN.
WHEEL FOR VEHICLES.

No. 604,155.  Patented May 17, 1898.

WITNESSES
John Buckler
C. Gerst

INVENTOR
Henry Forbes Julian
BY
Edgar Tate
ATTORNEYS.

ature of my invention, what I claim, and desire to secure by Letters Patent, is—

UNITED STATES PATENT OFFICE.

HENRY FORBES JULIAN, OF TEIGNMOUTH, ENGLAND.

WHEEL FOR VEHICLES.

SPECIFICATION forming part of Letters Patent No. 604,155, dated May 17, 1898.

Application filed July 6, 1897. Serial No. 643,592. (No model.)

*To all whom it may concern:*

Be it known that I, HENRY FORBES JULIAN, a subject of the Queen of Great Britain, residing at Teignmouth, in the county of Devon, England, have invented certain new and useful Improvements in Wheels for Vehicles, of which the following is a full and complete specification, such as will enable those skilled in the art to which it appertains to make and use the same.

This invention relates to improvements in the wheels of vehicles, and more particularly of motor and horse vehicles as used on ordinary roads; but it may also be applied to velocipedes, tram-cars, and railway-carriages.

The objects of the invention are to reduce vibration caused by unevenness of roads, to absorb or diminish noise produced by the tire rolling over a hard surface, to help in reducing the force of traction, to lessen shocks in starting or stopping, to reduce the oscillating effect of motors when used for propelling purposes, and to increase the durability of the vehicles.

This invention may be said to mainly consist in employing a hollow felly of channel or trough shape in cross-section, having the channel facing the hub of the wheel, and in the said channel is fitted a tube made of flexible material, which is inflated with air or other like elastic fluid and containing a hollow or depression on the side of the tube facing the hub to secure and support the rim of the wheel.

It further consists in employing a cover to protect the exposed part of the inflated tube and in employing an elastic substance or a flexible inflated tube interposed between a rigid ring and the inflated felly and also in the method of employing the tire, as hereinafter described.

The invention is fully disclosed in the following specification, of which the accompanying drawings form a part, in which the separate parts of my improvement are designated by the letters of reference in each of the views, and in which—

Figure 1:
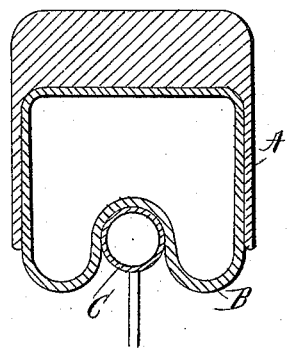

Figure 1 is a transverse section of one form of the rim, felly, and tire of a wheel made according to my invention; and Figs. 2, 3, 4, and 5, similar views of modified forms of construction.

Referring to the drawings, A is the cross-section of the felly, of metal or other suitable material, which is made hollow or channel shape in any suitable form and having the channel or hollow part facing or opposite to the hub, and into the said channel is fitted a tube B, of flexible material, capable of being inflated with air.

Figure 5:
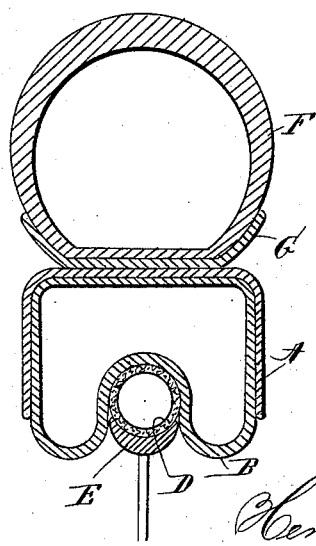

C is the rim of the wheel or a ring which connects or binds the spokes together at their outer extremities. The exterior or greatest diameter of the rim is greater than the smallest diameter of the inflated tube B, and thus forms a hollow or depression in the said tube as a seating for the rim C. The said depression may be formed in making the tube or may be produced by inflating the tube when the rim is in its position. The rim may be of metal, wood, or other suitable material and may be of any suitable cross-section. I find it sometimes advantageous to employ a rim consisting of a solid or hollow ring, of rubber or other elastic material, or an inflated flexible tube D, as shown in Fig. 5, of rubber and canvas or other suitable material, and to which is secured a ring E, of metal, wood, or other rigid material, and having the said ring of rubber or the said inflated tube interposed between the ring E and the tube B.

Figure 2:
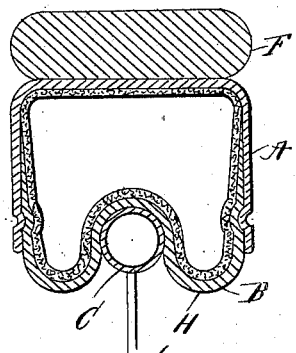
Figure 3:
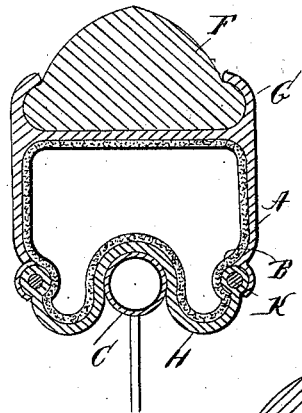

In order to protect the exposed portion of the inflated tube B from the action of the weather or from accident, I sometimes cover it with a flexible band H, of canvas or other suitable fabric or of rubber and canvas or leather or other suitable material, which passes under the rim and is secured to the flanges or sides of the felly. The said cover may be attached to the felly inside the channel, as shown in Figs. 2 and 3, or may be held securely in position by the pressure of the inflated tube B, but as a further security the felly or cover may have projections on its edges or sides fitting into corresponding hollows and may also be secured by cement. The cover may be secured to the felly outside of the channel by a suitable means, as shown in Fig. 4.

Figure 4:
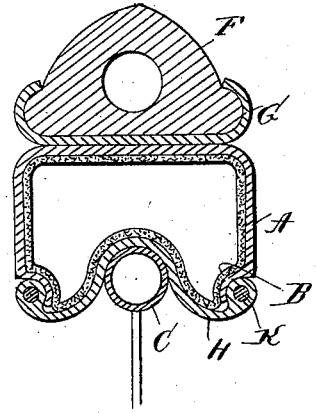

I sometimes make the edges of the cover of rubber, or rubber and canvas, or of such material as will readily expand and contract; but sometimes I find it advantageous to make the edges of material that is only with great difficulty made to stretch or contract, and for this purpose I attach to or within the flexible material of the cover rings of metal wire K, as shown in Figs. 3 and 4, wood, or other like material, which firmly secure the cover on the flanges or sides of the felly.

When the metal or wire rings are employed on the sides or at the edges of the cover, they are preferably made endless, but may be constructed with ends firmly secured.

Before the tube B is inflated it is put into its place within the channel of the felly, and the edges of the cover are loosely held against the flanges by placing the rings or projections into the hollows made to receive them. The rim of the wheel is placed loosely in position and the tube B is then inflated to a pressure of ten to sixty pounds, more or less, per square inch, which tightens it against the circumference of the rim, forming a depression on the surface of the said tube, and thereby secures the rim to the tire and felly and prevents lateral displacement.

When the cover is secured to the flanges of the felly, as shown in Fig. 4, and becomes deflated, the center part of the wheel remains suspended by the cover and the wheel may be used without reinflating, and thus save delay.

When the inflated tube D is employed to form part of the rim, as shown in Fig. 5, it admits of allowing a deeper depression in the tube B, and thereby makes the tire and felly more secure. The rim E D is placed in its proper position and is then inflated to a pressure of about twenty-five to one hundred pounds per square inch, and the tube B is next inflated to the desired pressure. The inflation may be effected in the ordinary manner of inflating pneumatic tires.

It is obvious that the inflated tube D of the rim may be made to form part of the tube B or cover H.

The channel-shaped felly A may be thickened on its tread, as shown in Fig. 1, and thus form the tire of the wheel; but as this might necessitate replacing the felly as the tire becomes worn I employ a felly made with a thin tread and protect this with a separate ring or tire F of steel, rubber, leather, or other suitable material.

When great resilience or noiselessness is desired, I place on the outer face or tread of the felly an elastic tire of rubber or other like material, which may be solid, as shown in Fig. 3, a cushion, as shown in Fig. 4, or pneumatic, as shown in Fig. 5, and this elastic tire may be secured by flanges G, rolled solid with the felly, as shown in Fig. 3, or made to form a separate ring or rings attached to the outer face of the felly, as shown in Figs. 4 and 5, thus forming with the felly a cross-section, which is H-shaped in form or an approximation to that section.

In the channel the tube B may be in one continuous piece or may be divided into any number of parallel chambers or segmental parts and may be inflated by any of the well-known methods.

The rim may be cemented to the inflated tube B or to the cover H, or may be simply held in position by the air-pressure of the inflated tube, or the cover and the rim may be formed in one piece built up together or may be otherwise secured.

It is obvious that when a cover is employed fixed to the felly and air-tight the inflated tube B may be dispensed with, as the cover and the felly together then form a tube in themselves.

When inflated, the depression in the tube or cover may be of any suitable depth and will be greater on the portion of the wheel that is lowermost, owing to the weight of the vehicle, while the upper portion may have little or no depression on its surface, and when the vehicle is being propelled from a point in front of the axle the center of the wheel moves slightly forward and becomes eccentric with the tire. The downward pressure of the dead-weight of the vehicle then assists propulsion.

Further obvious advantages are that the chamber of air and flexible tube absorb noise caused by the tire on the road and also act as a spring in reducing vibration and shocks, giving ease and comfort to the occupants of the vehicle and increasing its durability.

In order to prevent the center part of the wheel and rim parting with the felly in case of accident, I find it advantageous that the greatest diameter of the rim should be greater than the smallest diameter of the flanges of the felly, and lugs may be employed projecting inward from the flanges of the felly toward the center of the wheels as an equivalent for the same purpose.

I sometimes fill or partly fill the inflated tube B with a light spongy material—such as cork, hair, fiber, and the like—in order to support the rim in case of puncture or deflation, and sometimes the cover is securely held by the flanges of the felly for the same purpose. The vehicle can then be used without the tube B being inflated.

Having fully described my invention, I claim as new and desire to secure by Letters Patent—

1. In a wheel for vehicles, the combination with the rim of a wheel, of a felly, upwardly-directed flanges thereon, and a tube seated between said flanges, said felly and said rim whereby said parts are bound together said rim being of smaller dimension than the diameter of said tube whereby by the inflation of said tube a depression is formed to receive said rim and the various parts are more securely retained in their positions, substantially as described.

2. In a wheel for vehicles, the combination with the rim of a wheel, of a felly, upwardly-directed flanges thereon, a tube seated between said upwardly-directed flanges, said felly and said rim, downwardly-directed flanges on said felly and an independent tread seated between said downwardly-directed flanges, said rim being of smaller dimension than the diameter of said tube whereby by the inflation of said tube a depression is formed to receive said rim and the various parts are more securely retained in their position, substantially as described.

3. In a wheel for vehicles, the combination with the rim of a wheel, of a felly, upwardly-directed flanges thereon, a tube seated between said flanges said felly and said rim, downwardly-directed flanges on said felly, an independent tread seated between said last-mentioned flanges, a cover secured between the upper ends of said upwardly-directed flanges and means whereby said cover is firmly attached thereto, said rim being of smaller dimension than the distance between said first-mentioned flanges, whereby by the inflation of said tube, the various parts are more securely retained in their positions substantially as described.

4. In a wheel for vehicles, the combination with the rim of a wheel, of a felly, upwardly-directed flanges thereon, a tube seated between said flanges, said felly, and said rim, downwardly-directed flanges on said felly, an independent tread seated between said last-mentioned flanges, a cover secured between the upper ends of said flanges, said flanges being provided respectively with a projection whereby said cover is firmly attached thereto, said rim being of smaller dimension than the distance between said first-mentioned flanges, whereby by the inflation of said tube the various parts are more securely retained in their positions, substantially as described.

In testimony that I claim the foregoing as my invention I have signed my name, in presence of the subscribing witnesses, this 19th day of June, 1897.

HENRY FORBES JULIAN.

Witnesses:
AMY FOSTER PEDLEY,
ANNIE HEATH.